UNITED STATES PATENT OFFICE.

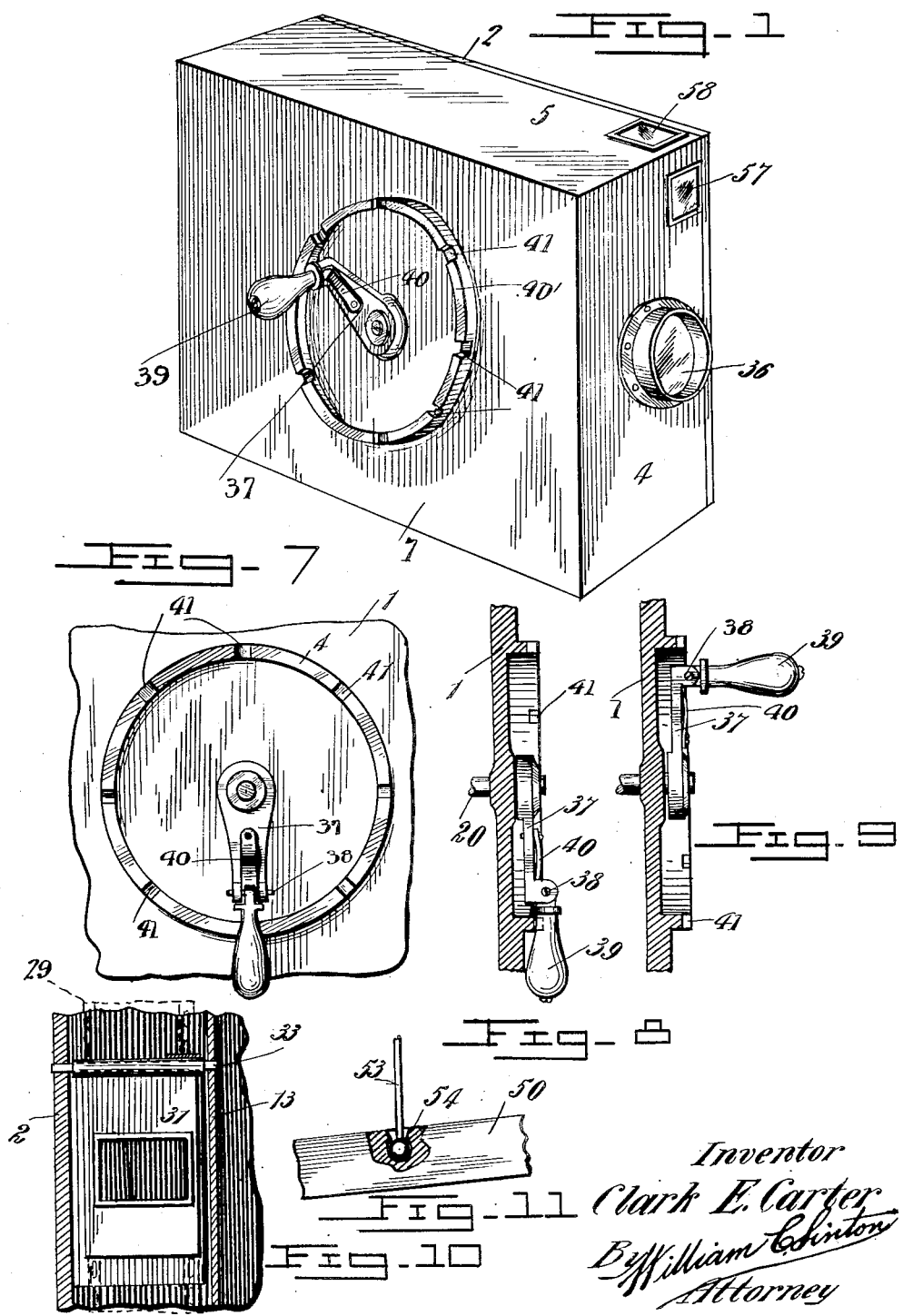

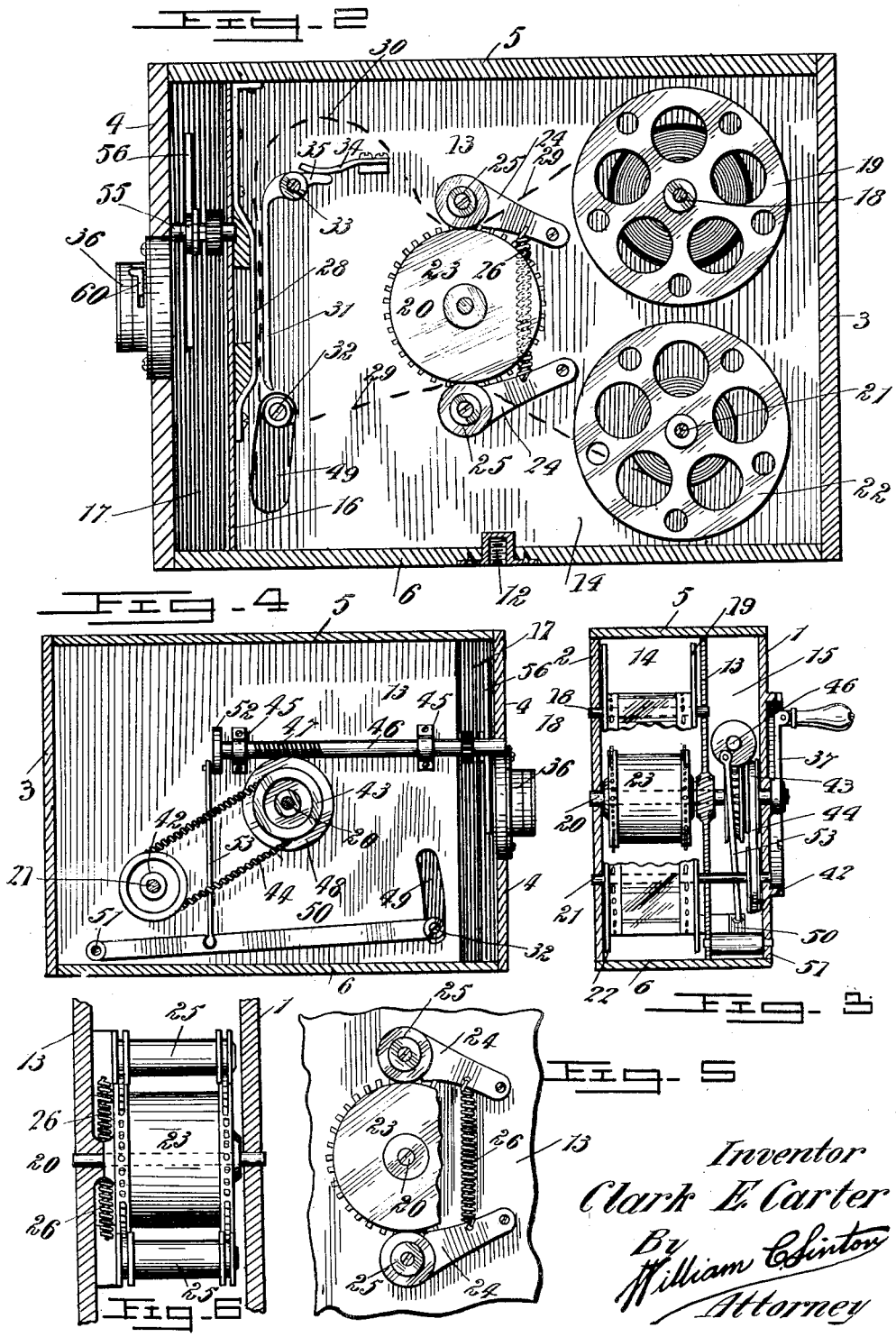

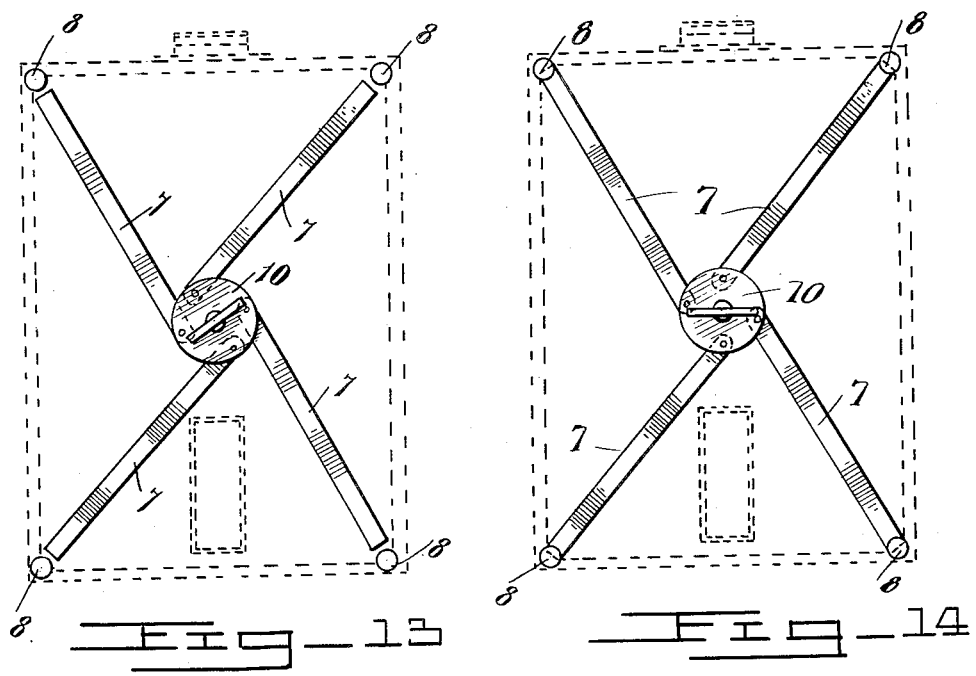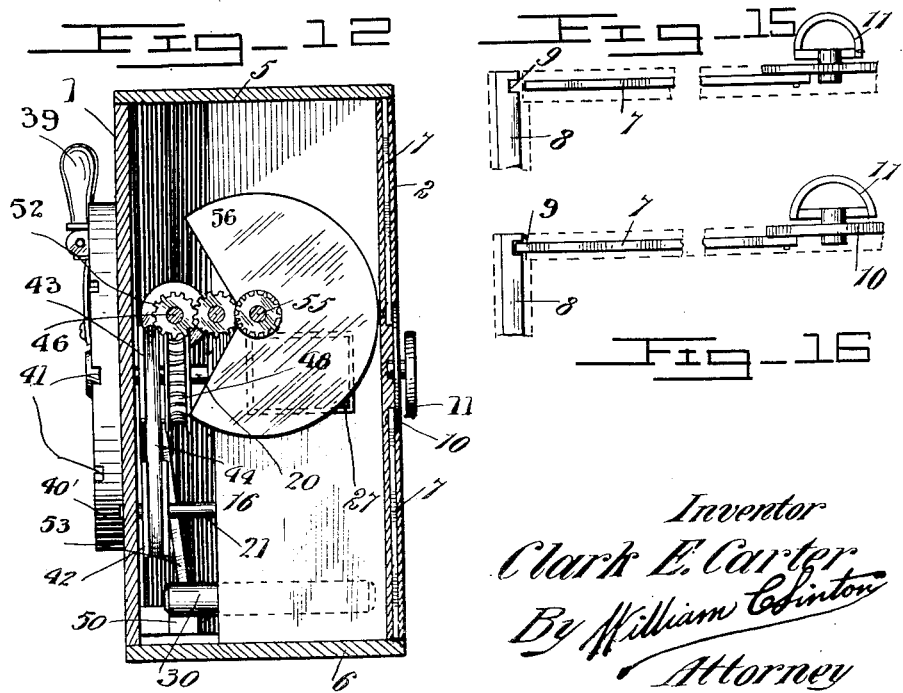

CLARKE E. CARTER, OF MONTREAL, QUEBEC, CANADA.

CAMERA.

1,406,973. Specification of Letters Patent. Patented Feb. 21, 1922.

Application filed December 6, 1919. Serial No. 343,008.

*To all whom it may concern:*

Be it known that I, CLARKE E. CARTER, a subject of the King of Great Britain, residing at Montreal, Province of Quebec, Canada, have invented certain new and useful Improvements in Cameras; and I do hereby declare that the following is a full, clear, and exact description of the invention, such as will enable others skilled in the art to which it appertains to make and use the same.

The present invention relates to cameras used more particularly for photographing pictures upon a strip so that these strips of pictures may be subsequently employed for displaying the pictures upon a screen.

The principal object of the present invention is to provide a camera of this character which may be used by inexperienced operators, so that the pictures derived therefrom may be displayed from a home moving picture machine.

A further object of the present invention is to provide a camera of this character that may be used for taking moving pictures, or it may be employed for taking a single picture at a time, such as a snapshot.

A further object of the present invention is to provide a camera of this character which will have the general appearance of an ordinary box kodak camera, so that it may be easily and readily transported from place to place, and one in which the parts thereof will be simple in construction, strong, durable and efficient in use and practically fool-proof.

With the above and other objects in view which will hereinafter appear as the description continues, the invention consists of the novel features of construction, combination and formation of parts as will be hereinafter more fully described and particularly pointed out in the appended claims.

In the accompanying drawings:

Figure 1 is a perspective view of the camera embodying the present invention;

Figure 2 is a vertical section therethrough;

Figure 3 is a transverse vertical section;

Figure 4 is a horizontal section through one side of the camera;

Figure 5 is a detail elevational view of the sprocket wheel;

Figure 6 is a similar view taken at right angles to Figure 5;

Figure 7 is an enlarged side elevation of the crank lever as applied to the frame of the camera;

Figure 8 is a vertical section through the same;

Figure 9 is a similar view showing another position of the crank lever;

Figure 10 is an enlarged detail view of the film gate;

Figure 11 is an enlarged detail sectional view of a portion of the beater mechanism;

Figure 12 is a vertical transverse section taken through the forward end of the machine;

Figure 13 is a plan view of the door locking mechanism when in open position;

Figure 14 is a similar view when in closed position;

Figure 15 is a detail view of the door locking mechanism when in open position; and Figure 16 is a similar view when in closed position.

Referring now more particularly to the accompanying drawings wherein like and corresponding parts are designated by similar reference characters through the several views.

The camera embodying the present invention comprises a suitable casing of preferably rectangular configuration, as shown, consisting of a stationary side wall 1, a detachable side wall 2, a rear wall 3, a front wall 4, and a top and bottom wall 5 and 6 respectively. This side wall or cover 2 is detachably connected to the casing so that access may be gained thereto when it is desired to remove or place the film within the camera. The locking means for retaining this door in place comprises four slidable rods 7 which are mounted in suitable grooves formed within the cover 2, as best illustrated in Figure 12. The casing is also provided with the reinforcing bars 8 having recesses 9 formed in the ends thereof for the reception of the outer ends of the bars 7. The inner ends of these bars 7 are eccentrically connected to a disk 10, and the latter is journaled within the door 2. Carried by this disk 10 is a pivotally supported handle 11 whereby the disk may be manually turned. From this construction, it is obvious that upon turning the disk in one direction, the bars 7 will be drawn from engagement with the members 8 whereby the cover 2 will be released and permitted to be withdrawn from the casing, but when this cover is placed in position and the disk 10 turned in an opposite direction, the bars 7 will be forced outwardly until they engage the locking members 8, thereby securely retaining the cover within the casing. The bottom 6 of the casing may be provided with a threaded socket 12, so that the camera may be seated upon the usual tripod support. Arranged within the casing is a partition 13 which forms a film holding chamber 14 and a chamber 15 in which is arranged the mechanism for moving the film within the camera. Also arranged within the casing adjacent the forward end thereof is a partition 16 which forms a third compartment 17 in which the shutter is arranged.

Journaled within the side wall 2 and the partition 13 is a shaft 18 adapted to support a reel 19 carrying the film upon which the picture is to be taken. Extending through the partition 13 and journaled within the side walls 1 and 2 is a central shaft 20 and a reel shaft 21 carrying a reel 22 upon which the film is to be wound. Keyed to this central shaft 20 is a sprocket wheel 23 having the usual sprocket teeth for receiving the perforations within the film. Pivotally supported upon the partition 13 are the arms 24 which carry the rollers 25 which are adapted to rest upon the sprocket wheel 23, and these rollers 25 are retained into engagement with the sprocket wheel by means of the coil spring 26.

The front partition 16 is provided with an opening 27 and carried by the inner face of this partition and extending around this opening 27 is a film guide or track 28. The film indicated by the numeral 29 passes from the reel 19 under the upper roller 25 where it is held into engagement with the sprocket wheel 23. This film then extends upwardly till it forms the usual loop 30 and then extends downwardly over the track 28 where it is properly retained in place by means of the gate 31. The film then extends over the beater roller 32, from there it passes under the sprocket wheel 23 and then to the film receiving spool or reel 22. The gate 31 is pivotally supported as at 33 and a leaf spring 34 rests upon an arm 35 of this gate so as to normally tend to hold this gate in the position, as better shown in Figure 2 whereby the film will be kept perfectly flat and vertical during exposure. Extending in alignment with the opening 27 formed within the wall 16 is a lens holder 36 and this lens holder is supported within the front wall 4 of the casing. One end of the shaft 20 extends beyond the side wall 1, and keyed to this extension is a crank 37 having hingedly connected thereto as at 38 a handle 39. A leaf spring 40 is carried by the crank 37 and is adapted to engage one end of this handle 39 so as to retain the handle in either position as shown in Figures 8 and 9. Formed with the side wall 1 of the casing is an annular flange 40' having preferably eight notches 41 formed therein, and this handle 39, when in the position as better shown in either Figure 7 or 8, is adapted to engage these notches for a purpose which will be later set forth, but when this handle 39 is in a horizontal position, as better shown in Figure 9, the operator, by turning the crank, will cause the sprocket wheel 23 to revolve whereby the film will be drawn from the reel 19 and wound upon the reel 22. The shaft 21 carrying the reel 22 has keyed thereto a pulley 42 and a similar pulley 43 is keyed to the shaft 20. A belt 44, preferably in the form of a coil spring, extends over these pulleys 42 and 43, so that when the shaft 20 is revolved, the shaft 21 will also be caused to rotate, but by having a resilient belt 44 as a means for connecting the shafts 20 and 21, it is evident that the film cannot be broken when passing from the sprocket wheel 23 to the winding reel 22.

Journaled within the bearings 45 carried by the partition 13 is a horizontally extending shaft 46. This shaft 46 is provided with a worm gear 47 adapted to mesh with a gear 48 carried by the shaft 20, so that when this shaft 20 is rotated, the shaft 46 will also be caused to rotate therewith. The beater roller 32 extends through an arcuate slot 49 formed within the partition 13 and is connected to one end of a lever 50, whereas the opposite end of this lever is pivotally supported as at 51. Carried by the inner end of the shaft 46 is a disk 52 and eccentrically connected to this disk 52 is a vertical rod 53 and the lower end of this rod 53 is connected by means of a ball and socket joint 54 to the lever 50. From this construction, it is obvious that when the shaft 20 is rotated from the handle 39, the beater will be reciprocated so as to draw each picture which has been taken past the opening 27. Journaled upon the shaft 55 is a shutter 56 which is so constructed as to give a variable ratio between the open time and the closing time, which is common and well-known. This shaft 55 is connected through the chain of gears, as better shown in Figure 12, to the shaft 46, so that when the film is drawn through the camera, the shutter will also be caused to revolve for opening and closing the aperture 27. The lens 36 may be of any well-known or preferred type, and in this case, it is shown as having a fixed focus. The front wall 4, as well as the top, 5, are provided with the view finders 57 and 58.

In using this camera, the door 2 is first removed by unlocking the same in the manner as before described. When this door 2 is removed one end of each of the shafts 18, 20 and 21 will be released, but the cover 2 may have suitable bearings arranged therein for receiving these projecting ends of the shafts, so that when the cover is placed in position upon the casing the shafts, may be inserted in their respective bearings whereby they will be properly retained in position. The reel 19 containing the unused film, is placed upon the shaft 18, and the free end of the film is drawn under the upper roller 25 through the gate 31, under the beater roller 32, again passing under the sprocket wheel 23 and connected to the reel 22 which is keyed to the shaft 21. By placing the cover 2 again in position, the film will be protected from exposure. The photographer, when locating the objects by the view finders 57 or 58, may, if he desires to take moving pictures of the objects, turn the handle 39 which will set the shaft 20 into motion and likewise cause the film to be drawn through the machine in the manner as previously described. When it is desired to take snapshots or only single pictures of each object, the handle 39 is swung to the position as better illustrated in Figures 7 and 8 of the drawings, so that it will come in contact with the notches 41 and thereby retain the shaft 20 in locked position. By moving this handle 39 to the next adjacent notch, one picture will be taken upon the film, and in this manner the same camera may be used for taking snapshots. The mechanism, as herein shown, is so geared that, upon each revolution of the shaft 20, eight pictures will be taken upon the film, and for this reason the flange 40 has eight notches 41 therein, so that eight snapshots may be taken upon each revolution of the main shaft. The lens 36 is provided with a projecting handle 60 whereby the shutter of the lens may be adjusted.

From the foregoing, it is apparent that I have produced a camera of simple and durable construction that may be used either for taking moving pictures or single pictures, and the film to be used in this camera may be the standardized film used to day, so that the moving pictures taken by this camera may be subsequently shown from a suitable projecting apparatus and more particularly a home moving picture machine.

Having thus fully described my invention, what I claim as new and desire to secure by Letters Patent is:

1. A camera of the character described comprising a casing, means for supporting and winding a strip of film within said casing, said winding mechanism comprising a sprocket wheel, a lever arranged exteriorly of said casing and connected to said sprocket wheel, said lever having a pivotally supported handle, and means whereby when said handle is in one position, the film winding mechanism may be set in motion for taking a continuous strip of pictures, and means whereby when said lever is moved to another position, single pictures may be taken upon said strip of film.

2. In a moving picture camera comprising a casing, a main shaft journaled within said casing, a crank handle connected to one end of said shaft, a sprocket wheel carried by said main shaft over which is adapted to pass a strip of film, a gear carried by said main shaft, a horizontal shaft, a worm carried by said horizontal shaft and adapted to mesh with said gear, a shutter operatively connected to said horizontal shaft, a beater roller, a pivotally supported lever having said beater roller connected to one end thereof, and means for operatively connecting said beater roller to said horizontal shaft.

3. In a moving picture camera the combination with a casing having a partition arranged therein for dividing the casing into two compartments, a main shaft journaled within said casing, a sprocket wheel carried by said shaft and arranged within one of said compartments, a film receiving reel arranged within one of said compartments, means for operatively connecting said main shaft with said film receiving reel, a beater roller arranged within one of said compartments, a lever connected to said beater roller and arranged within the other of said compartments, means for operatively connecting said lever to said main shaft, a revolving shutter, and means for operatively connecting said revolving shutter to said main shaft, substantially as and for the purpose specified.

4. In a moving picture camera, a casing, means therein for supporting and winding a strip of film, said winding means including a sprocket wheel, drive shaft and film supporting spool, a lever upon the outer side of the casing connected to the sprocket wheel, a pivotally supported handle for the lever, means co-operating with the lever, whereby when the handle is in one position the winding mechanism may be set in motion for taking a continuous strip of pictures, means whereby when the lever is moved to another position single pictures can be taken, a pulley for the drive shaft, and a coil spring belt connecting the pulley and film spool, as and for the purpose set forth.

It witness whereof I have hereunto set my hand.

CLARKE E. CARTER.